United States Patent [19]
Elbaum et al.

[11] Patent Number: 4,889,398
[45] Date of Patent: Dec. 26, 1989

[54] SELF REFERENCING AMBIGUITY FREE HOLOGRAPHY

[75] Inventors: Marek Elbaum, Dobbs Ferry, N.Y.; Dina Gutkowicz-Krusin, Princeton, N.J.; Jerzy Nowakowski, Bayside, N.Y.

[73] Assignee: Riverside Research Institute, New York, N.Y.

[21] Appl. No.: 177,667

[22] Filed: Apr. 5, 1988

[51] Int. Cl.⁴ .................. G03H 1/04; G03H 1/22; G03H 1/28

[52] U.S. Cl. .................. 350/3.67; 350/3.77; 350/3.81; 350/3.85

[58] Field of Search .............. 350/3.67, 3.69, 3.75, 350/3.77, 3.81, 3.82, 3.85, 3.86, 320

[56] References Cited

PUBLICATIONS

Elbaum et al., "Self-Reference Holographic Imaging Using Nonuniform Illumination", *Optics Letters*, vol. 13, No. 2 (Feb. 1988).

Rosen et al., "Film Plane Holograms Without External Source Reference Beams", *Applied Physics Letters*, vol. 10, No. 5 (Mar. 1, 1967).

*Primary Examiner*—Bruce Y. Arnold
*Assistant Examiner*—David J. Edmondson
*Attorney, Agent, or Firm*—Brumbaugh, Graves, Donohue & Raymond

[57] ABSTRACT

A method for self-referencing holography makes use of multiple object illuminations with different and nonuniform intensity of radiation to produce multiple holograms from the scattered radiation. Analysis of the multiple holograms provides an unambiguous image of the object.

34 Claims, 2 Drawing Sheets

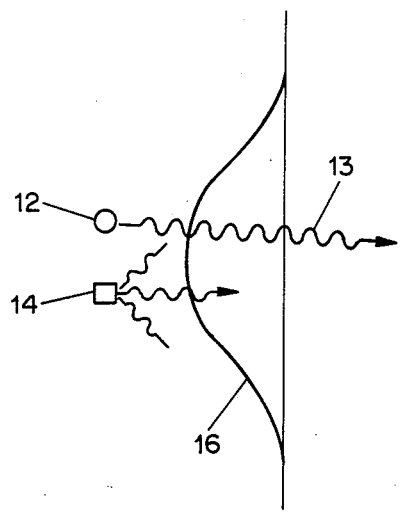
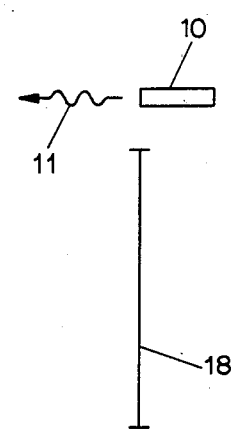
FIG. 1 (PRIOR ART)
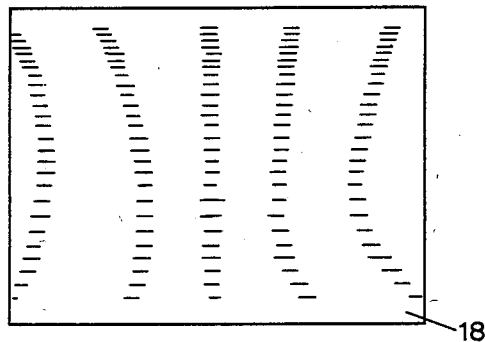
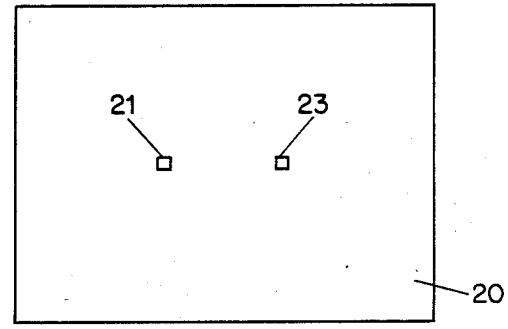
FIG. 2 (PRIOR ART)   FIG. 3 (PRIOR ART)
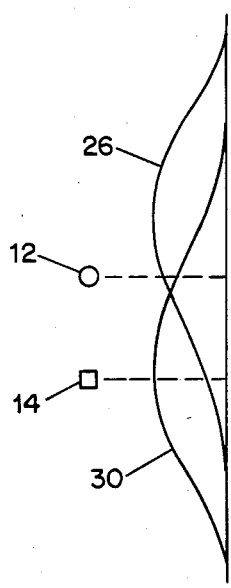
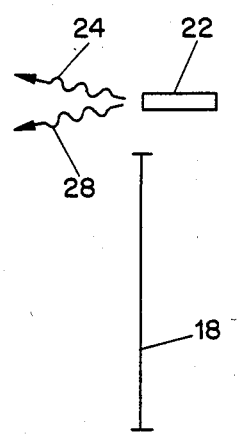
FIG. 4

SELF REFERENCING AMBIGUITY FREE HOLOGRAPHY

BACKGROUND OF THE INVENTION

The present invention relates to holographic imaging and particularly to unambiguous reconstruction of holographic images.

In conventional holographic imaging a hologram is generated from spatial interference between radiation reflected from an object to be imaged and radiation from a reference source. FIG. 1 illustrates one possible geometry for recording a holographic image wherein a laser 10 emits radiation 11 toward an object field containing a reference reflector 12 and an object 14. The intensity of the radiation in the object field is represented by Gaussian intensity curve 16. In the illustrated example the reference reflector 12 is a retroreflector which provides a strong reflected signal 13 toward laser 10 and thereby acts as a reference source for generation of a hologram. Object 14 is assumed to be a diffuse reflector which scatters the illuminating radiation from laser 10 in many directions as illustrated by scattered radiation 15.

The interference pattern of the radiation reflected by reference reflector 12 and object 14 is detected in holographic plane 18 and appears as a holographic interference pattern as shown generally in FIG. 2. The holographic interference pattern or hologram may be used to construct a holographic image of object 14, either optically or by numerical computation, such as computer algorithm.

In conventional holography the reference source 12 must be displaced from the object 14 to be imaged because the reconstructed image 20, shown in FIG. 3 will include two images 21, 23 of the object 14 on opposite sides of the reference source location. This results from the fact that the interference pattern or hologram does not contain information concerning the direction (positive or negative) of the offset of the object 14 from reference source 12. The reference must accordingly be displaced from the object so that the two images 21, 23 do not overlap, causing image confusion.

It is an object of the present invention to provide a method of holographic imaging which provides an unambiguous holographic image.

It is a further object of the invention to provide a method for unambiguous holographic imaging of an object utilizing a reference source within the object.

It is a further object of the invention to provide a method for holographic imaging of an object using a reflection from the object as a reference.

SUMMARY OF THE INVENTION

In accordance with the invention there is provided a method of holographic imaging comprising illuminating an object with at least two radiation beams having different non-uniform spatial radiation characteristics across the object, detecting holograms of the object for each radiation beam which are generated as a result of interference between radiation reflected by the object and radiation from at least one reference source for each radiation beam, and analyzing said holograms to form an unambiguous holographic image.

For a better understanding of the present invention, together with other and further objects, reference is made to the following description, taken in conjunction with the accompanying drawings and its scope will be pointed out in the appended claims.

BRIEF DESCRIPTION OF THE DRAWINGS

FIG. 1 is a simplified two dimensional diagram illustrating a prior art method for holographic imaging.

FIG. 2 is a drawing representing a hologram according to the prior art.

FIG. 3 is a drawing representing a holographic image according to the prior art.

FIG. 4 is a simplified two dimensional diagram illustrating a portion of the method of the present invention.

DESCRIPTION OF THE INVENTION

Figure 5:
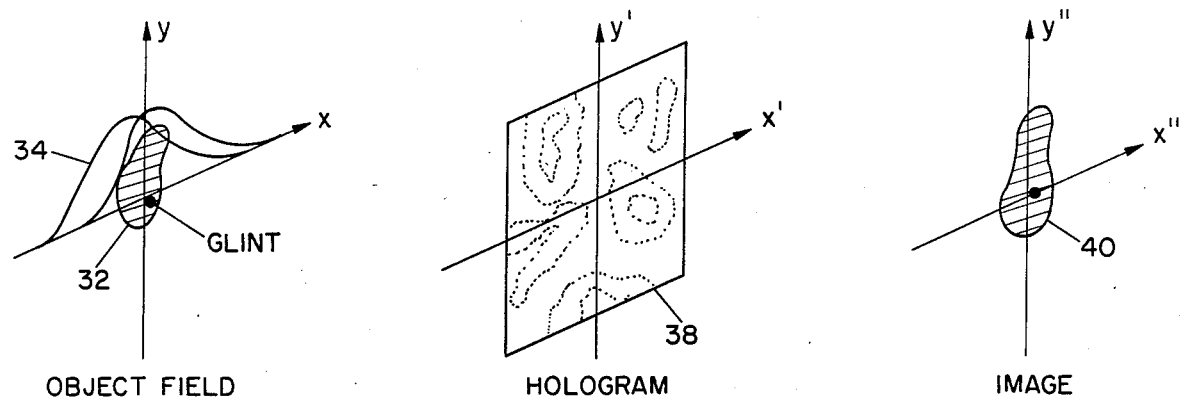
FIG. 5 is a simplified two dimensional diagram further illustrating a portion of the method of the present invention for imaging an object having a single specular reflection.

FIG. 4 is a simplified, two-dimensional diagram illustrating the method of the present invention. In accordance with the invention a laser source 22 is used to radiate, time-sequentially, two beams designated 24 and 28 which are angularly displaced from each other, for example by one half the angular half power beamwidth. In the illustrated embodiment the beams are displaced symmetrically about the location of reference object 12 and have a Gaussian power distribution as shown by graphs 26 and 30 corresponding respectively to beams 24 and 28.

For purposes of a simplified explanation, it is assumed that the object field includes a single point object 14 and a reference retroreflective object 12, as in the prior art example. As each of beams 24, 28 illuminates objects 12 and 14 a holographic interference pattern, similar to the pattern 18 illustrated in FIG. 2 is detected by conventional techniques, with a film or electronic, photodetectors in observation or holographic plane 18. Each of the interference patterns can be used to develop a holographic image of the type shown in FIG. 3, each image having two images 21, 23 of object 14. Because of the different, non-uniform intensity of laser beams 24 and 28 in the object field, the corresponding images 21, 23 will have distinguishably different intensity. Accordingly, the image ambiguity can be resolved logically by deciding that the object 14 is in the left portion of image 20, corresponding to image 21. Image 23 can accordingly be logically eliminated, forming an image of the object field without ambiguity. By thus eliminating duplicative images, it is possible to image objects surrounding both sides of reference source 12 and obtain unambiguous and non-overlapping images. In actual practice the process of logically eliminating an image is performed by mathematical algorithm, in essence developing equations representing the various image point intensities dependent on the various known beam amplitude distributions and positions and having unknowns representing the reflectivity of the object field at each point corresponding to an image location. These equations can be solved to develop representations of point-by-point relative object reflectivity, thereby generating an unambiguous image.

FIG. 5 illustrates the application of the method of the present invention for developing an unambiguous image of an object in the object field utilizing a specular reflection from the object itself as a reference source. Most objects, when illuminated, provide specular reflections and diffuse reflections. A specular reflection is a strong glare or "glint" reflection from the object which typically results from reflection by a smooth surface on the object which is locally perpendicular to the angle of incidence of the illuminating radiation. Diffuse reflections are lower intensity reflections from other portions of the object which result from radiation which is diffusely scattered. Most objects, when illuminated, produce one or more glints in addition to diffuse radiation.

Object 32 shown at the left of FIG. 5 is an irregularly shaped object having one area of specular reflection indicated by the dot labeled "glint". It is illuminated by two laser beams having x-axis amplitude distribution represented by Gaussian curves 34 and 36. The reflected signal from the glint in the direction opposite to the direction of incident radiation is much larger than the diffuse scattering from other areas of the object and causes interference patterns forming a hologram represented by the holographic interference patterns 38 which are illustrated at the center of FIG. 5. Fourier transformation of these patterns yields two image patterns with linear relationship to the reflectivity of each point of object 32, and to the field intensity of the illumination of object 32 by beams having intensity patterns 34 and 36. These linear relations can be solved for the reflectivity at each point of object 32 yielding an image 40 representing the unambiguos holographic image of the object.

Figure 6:
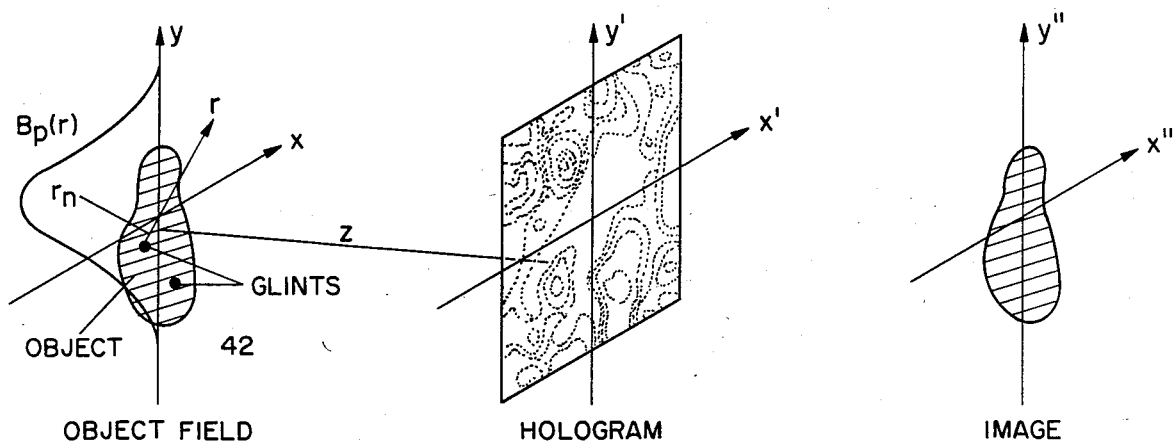
FIG. 6 is a simplified diagram illustrating the method of the present invention for imaging an object having multiple specular reflections.

A more general example is illustrated in FIG. 6 wherein an object 42 has multiple points of specular reflection "glints", and is illuminated by multiple beams. The reflectivity of the object is represented by the function $a(\vec{r})$. The reflectivity of the glints is represented by the function $A(\vec{r})$. Each illuminating beam is represented by the function $B_p(\vec{r})$ where p is the index number.

Assuming that each specular reflection in the object field is from a point source and there are N such sources indexed by n, the field at a point $\vec{r'}$ in the holographic plane for each illumination is:

$$U(\vec{r'}) = U_r(\vec{r'}) + U_o(\vec{r'})$$

where $$U_r(r') \propto \sum_{n=1}^{N} A(r_n) B_1(r_n) \exp[i\pi(r' - r_n)^2/\lambda]$$

$$U_o(r') \propto \int dr\, a(r) B_1(r) \exp[i\pi(r' - r)^2/\lambda z]$$

The hologram intensity can be measured by non-coherent radiation detectors and is:

$$|U|^2 = |U_r|^2 + U_r U_o^* + U_r^* U_o + |U_o|^2.$$

Assuming that $|U_R| >> |U_o|$, which is true for specular reflections as references, the last term can be ignored. The term $|U_R|^2$ represents the interference between the reference signals, which can be determined independently by conventional imaging, or from the hologram by appropriate processing, and removed from the holographic interference pattern, resulting in the interference pattern of interest:

$$\Delta U(r') = U_R U_o^* + U_R^* U_o$$

An image in the $\vec{r''}$ plane is constructed by taking the Fourier transform of the hologram:

$$F_1(r'') = \int dr'\, \Delta U(r') \exp[i(2\pi/\lambda z) r' \cdot r''] \propto$$

$$\sum_{n=1}^{N} [A^*(r_n) B_1^*(r_n) B_1(r_n + r'') a(r_n + r'') +$$

$$A(r_n) B_1(r_n) B_1^*(r_n - r'') a^*(r_n - r'')]$$

where
$\vec{a}(\vec{r}) \equiv a(\vec{r}) \exp[i(\pi/\lambda z)r^2]$
$\vec{A}(\vec{r}) \equiv A(\vec{r}) \exp[i(\pi/\lambda z)r^2]$ For classical on-axis holograpy there is created a pair of image points $\vec{a}(\vec{r_n}+\vec{r''})$ and $\vec{a}(\vec{r_n}-\vec{r''})$ for each reference source in the object field corresponding to a glint on the object. Accordingly the image plane will contain up to 2N overlapping images. In accordance with the invention, a series of 2N beams are used to generate holographic and image data from an object field containing N reference glints. There are 2N unknown quantities in each field for each pont r'' corresponding to the object reflectivities $\vec{a}(\vec{r_n}+\vec{r''})$ and $\vec{a}(\vec{r_n}-\vec{r''})$ for n=1, 2 ... N. Using 2N illumination beams of known and different spatial amplitude distribution, it is possible to obtain 2N independent linear equations that can be solved for the unknown reflectivities corresponding to the desired images. These equations might be described as $F_p$, where p=1, 2, ..., 2N, using illumination pattern $B_p$.

Accordingly "coding" the object reflectivity with non-uniform illumination, the overlapping images can be separated, provided, for the illustrated algorithm, the number of independent beam patterns is equal to or greater than 2N. The method not only allows unambiguous imaging, but also permits location of the objects with respect to the line of sight of the illuminating beam.

In cases of practical interest when objects have optically rough surfaces, the object complex reflectivity can be modelled as a stochastic random process; different realizations of this process are probed during the object illumination by different beams. The corresponding holograms are therefore random (speckled). In this case we consider the averaged power spectrum, which, for fixed references, is given by $$|F_p(r)|^2 \propto \sum_{n=1}^{N} |A(r_n)|^2 |B_p(r_n)|^2 [|B_p(r_n + r')|^2 <$$

$$|a(r_n + r')|^2 > + |B_p(r_n - r')|^2 < |a(r_n - r')|^2 >]$$

All other terms vanish in the standard model of diffuse objects. The average is taken over different realizations of random reflectivity of a diffuse object for a given beam. The algorithm in this case has a similar structure to the one desribed earlier for objects with constant reflectivities except that the quantities to be determined are now the averaged object reflectivities.

Implementation of this novel technique can be straightforward. Non-uniform illumination is provided by a Gaussian laser beam. The holograms are formed with the laser pointing in different, known directions. For diffuse objects with discrete glints the reconstruction can be performed by averaging over a number of realizations of the speckle pattern obtained with each beam position.

While there has been described what is believed to be a preferred embodiment of the invention, those skilled in the art will recognize that many variations are possible. The invention is generally applicable to all forms of radiation which exhibit a wave nature manifested in interference which can be detected, including electromagnetic waves such as laser, X-ray, and microwave and sonic and ultrasonic waves. Multiple illuminations, rather than being time sequential may be concurrent in time, but coded using different illumination frequencies, e.g. provided by different frequency lasers. In another variation, rather than vary the amplitude of illumination in the object field, it is possible to "code" the object field by providing a beam whose frequency varies across the object field. Further, rather than using discrete beam positions, it is possible to use a continuously time varying beam position and detect time varying interference patterns. It will be understood by those skilled in the art that the term object as used in the appended claims is intended to encompass not only a single unitary object but also a collection of objects within the object field being observed and imaged.

A computer program which has been used to process holographic image data to provide unambiguous holographic images is set forth on the following pages.

RIVERSIDE RESEARCH INSTITUTE
Copyright © 1988 Riverside Research Institute

```
C HOLO_N_Ims1 -- holography from speckled Images WITH SOUPED UP RECONSTRUCTION
C for n glints and 2N beams
C
C assumes real glint and real beam
C
      PARAMETER (NSIZE=256,NSIZE2=NSIZE/2,NSIZE4=NSIZE/4)
CX      PARAMETER (NBEAMS=4,NGLINTS=NBEAMS/2)
      PARAMETER (NBEAMS=2,NGLINTS=NBEAMS/2)
      PARAMETER (NSIZE_OUT=128)
C
      DIMENSION DATA(NSIZE,NSIZE),DUMMY(2*NBEAMS)
     * ,    TARG(NSIZE_OUT,NSIZE_OUT,NBEAMS)
     * ,    TARG2(-NSIZE_OUT/2:NSIZE_OUT/2-1,
     *            -NSIZE_OUT/2:NSIZE_OUT/2-1,NBEAMS)
C
     * ,        BEAM(-NSIZE/2:NSIZE/2-1,-NSIZE/2:NSIZE/2-1)
C note three dimensions
     * ,        Z(NSIZE,NSIZE,NBEAMS)
     * ,        Z2(-NSIZE/2:NSIZE/2-1,-NSIZE/2:NSIZE/2-1,NBEAMS)
C
     * ,        IX_BEAM(NBEAMS),IY_BEAM(NBEAMS)
     * ,        SEEDSIN(2)
C
      REAL*8 M(NBEAMS,NBEAMS),T(NBEAMS)
      EQUIVALENCE (Z,Z2),(T,DATA),(TARG,TARG2)
C
      CHARACTER*80 INFILE,OUTFILE,Q*1,OUTFILE_HOLO(NBEAMS)
      LOGICAL*1 QUESTION,FILE,SCREEN,SHRINK,FIRST_TIME/.TRUE./,TRY_AGAIN
     * ,        INVERSE,HOLO_FILE
C
      CHARACTER*1 CBOARD
      COMMON /DISPLAY_PARAM/LINE,ICOLUMN,IQUAD,LINE_Q,ICOLUMN_Q,CBOARD
C---buffers-----
      DATA IREAL/1/,ISMALL/2/,ICOMP/3/,ISCRATCH/4/,ISCALE/5/,IMAX/6/
     * ,   ITMP/7/,IDIV/8/,IGAUSS/9/,ICOMP2/10/,IBEAM0/11/
     * ,   IBEAM/12/,ITMP2/13/,IREAL2/14/,IBG1/15/,IREAL3/16/
     * ,   IREAL4/17/,IA0_MINUS/18/,IA1_MINUS/19/,ISEEDS/26/
     * ,   IACCUM1/27/IACCUM2/28/
C IBG(I,J) is value of beam I at glint J
      INTEGER*4 IBG(NBEAMS,NGLINTS) !filled below
     * ,        IGLINT(NGLINTS) !filled below
C----------------
      REAL*4 BG(NBEAMS,NGLINTS),GLINT(NGLINTS)
      DIMENSION IOFF(NGLINTS),IX_G(NGLINTS),IY_G(NGLINTS)
C
      DO J=1,NGLINTS
         IGLINT(J)=60+J
         DO I=1,NBEAMS
            IBG(I,J)=40+(I-1)*NBEAMS+J
            OUTFILE_HOLO(I)='ZX.UFD'
            WRITE(OUTFILE_HOLO(I)(2:2),'(I1)')I
         END DO
      END DO
```

```
C get initial seeds
      TMP=SECNDS(0.0)
      SEEDSIN(1)=1.E10*TMP
      SEEDSIN(2)=1.E12*RAN(INT(TMP))
C
      CALL LIB$GET_INPUT(INFILE,'enter input file name=>')
C default
      IF(INFILE(1:1) .EQ. ' ')INFILE='CLUSTER_SMALL.UBD'
C
      CALL INPUT_UB(DATA,NSIZE,INFILE)
C
      NSAMP=INT(ASK('how many samples? '))
C
      FILE=QUESTION('do you want an output file','Y')
      IF(FILE)THEN
          CALL LIB$GET_INPUT(OUTFILE,'enter output file name=>')
      END IF
      HOLO_FILE=QUESTION('do you want any hologram files','Y')
      IF(HOLO_FILE)THEN
          N_HOLO_FILES=INT(ASK('how many (files are "Z")? '))
      END IF
C
      SHRINK=QUESTION('do you want to use 1/N holo','N')
      IF(SHRINK)THEN
          ZSHRINK=ASK('what AREA factor (<1)? ')
      END IF
C
C get glint info
      GLINT_MIN=1.E30
      DO I=1,NGLINTS
          WRITE(6,20)I
20        FORMAT('$enter glint AMPLITUDE <1.E8>, position (0,0 is middle)'
     *    ,    /,'$for glint',I2,'=>')
          READ(5,*)GLINT(I),IX_G(I),IY_G(I)
C find minimum glint
          IF(GLINT(I) .LT. GLINT_MIN)GLINT_MIN=GLINT(I)
      END DO
C get beam info
      ISIZE_BEAM=INT(ASK('enter size of beam=>'))
      DO I=1,NBEAMS
          WRITE(6,30)I
30        FORMAT('$enter x,y position of beam',I2,'=>')
          READ(5,*)IX_BEAM(I),IY_BEAM(I)
      END DO
C
C fix target
      DO J=1,NSIZE
      DO I=1,NSIZE
          DATA(I,J)=SQRT(DATA(I,J)/255.)
      END DO
      END DO
C
      CALL KINIT
C allocate some buffers
      CALL KALDB(1,ISCALE)
      CALL KALDB(2,IMAX)
      DO J=1,NGLINTS
          CALL KALDB(1,IGLINT(J))
C transfer value
          CALL KHFAF(GLINT(J),IGLINT(J),1)
          DO I=1,NBEAMS
              CALL KALDB(1,IBG(I,J))
          END DO
      END DO
      CALL KALDB(2,ISEEDS)
      CALL KALDB(NSIZE*2+26,ISCRATCH)
      CALL KFFT0(2*NSIZE) !FFT sin/cos table
      CALL KSQRQ(6)   !square root table
      CALL KALDB(NSIZE**2,IREAL)
      CALL KALDB(NSIZE**2,IACCUM1)
      CALL KALDB(NSIZE**2,IACCUM2)
      CALL KZRDB(IACCUM1)
```

```
      CALL KZRDB(IACCUM2)
      CALL KALDB(NSIZE**2,IBEAMO)
      CALL KALDB(NSIZE**2,IBEAM)
      CALL KALDB(2*NSIZE**2,ICOMP)
      CALL KALDB(NSIZE**2,IREAL2)
C transfer target
      CALL BIGTRANSFIN(DATA,IREAL,NSIZE**2)
C get centered beam
      CALL GET_ILLUM(BEAM,IBEAMO,NSIZE,ISIZE_BEAM,0,0)
C--------
C***NOTE this method puts zeroes in at edges.  Also later beam
C will be shifted again in the opposite directions.
C Target size and shift sizes should be arranged so dead zone
C does not intersect target and for actions later the distance from glint
C to target is relevent.  To avoid the problem the beams can be regenerated
C for each desired position
C-----
C transfer initial seeds
      CALL KHFAF(SEEDSIN,ISEEDS,2)
C
      DO LBEAM=1,NBEAMS
C NOTE no indent for this loop
C
C zero the accumulator
      CALL KZRDB(IACCUM1)
C
      DO ISAMP=1,NSAMP
        WRITE(*,'(1X,A,I2,A,I3)')'beam',LBEAM,'  sample',ISAMP
C get complex Gaussian.
        CALL GET_GAUSS_3(ICOMP,NSIZE,IREAL2,ISEEDS)
C copy centered beam to second buffer
        CALL KDBDB(IBEAM,IBEAMO)
C shift to the desired positions
        CALL AP_SHIFT(IBEAM,NSIZE,IREAL2,IX_BEAM(LBEAM),IY_BEAM(LBEAM))
C get the value of the current beam at each glint positions
        IMID=(NSIZE+1)*NSIZE2
        DO LGLINT=1,NGLINTS
          IOFF(LGLINT)=IX_G(LGLINT)*NSIZE - IY_G(LGLINT)
          CALL LDBDB(IBG(LBEAM,LGLINT),0,IBEAM,IMID+IOFF(LGLINT),1)
C multiply times glint value
          CALL KMUL(IBG(LBEAM,LGLINT),IBG(LBEAM,LGLINT),IGLINT(LGLINT))
        END DO
C multiply by beam, get FFT, magnitude square, inverse FFT and mag2
C
C multiply target times beam
        CALL KMUL(IREAL2,IREAL,IBEAM)
C multiply by complex Gaussian
        CALL KMLRC(ICOMP,ICOMP,IREAL2)
cxxxx         CALL KRCOM(ICOMP,IREAL2)!CXXXX
C put glint*beam into real part
        DO LGLINT=1,NGLINTS
          CALL LDBDB(ICOMP,2*(IMID+IOFF(LGLINT)),IBG(LBEAM,LGLINT),0,1)
        END DO
C take FFT in place; first set scale factor in scratch buffer
        SCALE=1.
        CALL KHFAF(SCALE,ISCRATCH,1)
C do the fft in place.
        CALL KCFT2(NSIZE,NSIZE,ICOMP,ICOMP,ISCRATCH)
C get mag squared in place
        CALL KMCCJ(ICOMP,ICOMP,ICOMP)
C if pulling out only SHRINK, send back to VAX and do it there
        IF(SHRINK)THEN
          CALL KRLDB(IREAL2)
          NSMALL=NINT(FLOAT(NSIZE)*SQRT(ZSHRINK))
C make sure it's even
          IF( (NSMALL/2)*2 .NE. NSMALL)NSMALL=NSMALL+1
C average pad the small stuff:
C put into real buffer
          CALL KCOMR(IREAL,ICOMP)
C get a small buffer to shrink to
          CALL KALDB(NSMALL**2,ITMP)
```

```
C fill another small buffer with 1/nsmall**2
            CALL KALDB(NSMALL**2,IDIV)
            CALL KZRDB(IDIV)
            CALL KHFAF(1./FLOAT(NSMALL**2),ISCALE,1)
            CALL KADDS(IDIV,IDIV,ISCALE)
C pull out middle of IREAL
            CALL AP_SHRINK(IREAL,ITMP,NSIZE,NSMALL)
C get the average
            CALL KDOT1(ISCALE,IDIV,ITMP)
C back to VAX
            CALL KAFHF(AVG,ISCALE,1)
C grow back into IREAL padded with the average
            CALL AP_GROW_2(ITMP,IREAL,NSMALL,NSIZE,AVG)
C deallocate small buffers
            CALL KRLDB(IDIV)
            CALL KRLDB(ITMP)
C convert back to complex
            CALL KRCOM(ICOMP,IREAL)
C reallocate
            CALL KALDB(NSIZE**2,IREAL2)
          END IF
C take the Inverse FFT in place
          SCALE=1./FLOAT(NSIZE**2)
          CALL KHFAF(SCALE,ISCRATCH,1)
          CALL KCIT2(NSIZE,NSIZE,ICOMP,ICOMP,ISCRATCH)
C get magnitude squared in place (goes into first half)
          CALL KCMGS(ICOMP,ICOMP)
C zero out the DC (it's in first element before flipping)
          CALL LZRDB(ICOMP,0,1)
C flip into IREAL2
          CALL AP_FLIP(ICOMP,NSIZE,IREAL2)
C add to accumulator
          CALL KADD(IACCUM1,IACCUM1,IREAL2)
        END DO !next sample
C
C send average to VAX...
C...first divide by number of samples
        CALL KHFAF(1./FLOAT(NSAMP),ISCALE,1)
        CALL KMULS(IACCUM1,IACCUM1,ISCALE)
        CALL BIGTRANSFOUT( Z(1,1,LBEAM),IACCUM1,NSIZE**2)
C find and zero out the glints
CX        DO III=1,NBEAMS
C first location contains the max, second contains Index (Integer)
CX          CALL KMAXI(IMAX,IACCUM1)
CX          CALL KAIH3(IOFF,IMAX,1,0)   !AIH3 or AIHL??
CX          CALL LZRDB(IACCUM1,IOFF,1)
CX        END DO
C
          IF(HOLO_FILE .AND. LBEAM .LE. N_HOLO_FILES)THEN
            CALL BIGTRANSFOUT(DATA,IACCUM1,NSIZE**2)
            CALL OUTPUT_UF(DATA,NSIZE,OUTFILE_HOLO(LBEAM))
          END IF
C
      END DO !repeat for next beam
C
C transfer all the beam*glint values...then square them
      DO J=1,NGLINTS
      DO I=1,NBEAMS
        CALL KAFHF(TMP,IBG(I,J),1)
CXXXX        BG(I,J)=TMP
        BG(I,J)=TMP**2
      END DO
      END DO
C square the beam and send it
      CALL KMUL(IBEAMO,IBEAMO,IBEAMO)
      CALL BIGTRANSFOUT(BEAM,IBEAMO,NSIZE**2)
C
      WRITE(*,*)'XGLINT:',IX_G
      WRITE(*,*)'YGLINT:',IY_G
      WRITE(*,*)'XBEAM:',IX_BEAM
      WRITE(*,*)'XBEAM:',IY_BEAM
```

```
          DO J=-NSIZE_OUT/2,NSIZE_OUT/2-1
          DO I=-NSIZE_OUT/2,NSIZE_OUT/2-1
C fill the T and M matrices
          DO IB=1,NBEAMS
              IF(Z2(I,J,IB) .GT. 0.1*GLINT_MIN)THEN
                  T(IB)=0.
              ELSE
                  T(IB)=Z2(I,J,IB)
              END IF
              DO IG=1,NGLINTS
                  IX=    IX_G(IG)-IX_BEAM(IB)
                  IY=-  ( IY_G(IG)-IY_BEAM(IB) )   !- since +Y is up
                  M(IB,IG)=BG(IB,IG)*BEAM(-I+IY,-J+IX)
                  M(IB,IG+NGLINTS)=BG(IB,IG)*BEAM(I+IY,J+IX)
              END DO
          END DO
C solve the equations
          CALL LEQT1F(M,1,NBEAMS,NBEAMS,T,0,DUMMY,IER)
C
          IF(IER .NE. 0)THEN !singularity
              WRITE(*,*)'singularity at ',I,J
              DO III=1,NBEAMS
                  TARG2(I,J,III)=0.
              END DO
          ELSE
              DO III=1,NBEAMS
C--XX             IF(T(III) .GT. 0.0 .AND. T(III) .LT. 3.0)THEN
                  TARG2(I,J,III)=T(III)
C--XX             ELSE
C--XX                 TARG2(I,J,III)=0.
C--XX             END IF
              END DO
          END IF
      END DO
      END DO
C
      IF(FILE)THEN  !output first solution
          DO I=1,NBEAMS
              CALL OUTPUT_UF(TARG(1,1,I),NSIZE_OUT,OUTFILE)
          END DO
      END IF
C
      END
C----------------------------------------------------------------------
C SUBROUTINE DETerminant_4D_Double_Precision --MSW 7/87
C This subroutine will find the determinant of a four by four matrix
      SUBROUTINE DET_4D_DP(ARRAY_IN,DELTA_OUT)
      REAL*4 ARRAY_IN(4,4)
      REAL*8 ARRAY(4,4),SUB(3,3),DEL,DELTA
C use double precision for internal use
      DO J=1,4
      DO I=1,4
          ARRAY(I,J)=ARRAY_IN(I,J)
      END DO
      END DO
C DELTA is the result of the determinant
      DELTA=0.0
      DO I=1,4
C for each I extract the 3x3 sub-matrix
      DO J=1,3
        DO K=1,3
          IF(I .EQ. 1 .OR. I .EQ. 3 .AND. J .EQ. 3 .OR.
     *          I .EQ. 2 .AND. J .GT. 1)THEN
              SUB(J,K)=ARRAY(J+1,K+1)
          ELSE IF(I .EQ. 4 .OR. I .EQ. 2 .AND. J .EQ. 1
     *          .OR. I .EQ. 3 .AND. J .LT. 3)THEN
          END IF
        END DO
      END DO
      CALL DET_3D_DP(SUB,DEL)
      DELTA=DELTA+(-1.0)**(I+1)*ARRAY(I,1)*DEL
      END DO
```

```
C
      DELTA_OUT=DELTA
C
      RETURN
      END
C*****************************************************************************
C
      SUBROUTINE DET_3D_DP(A,D)
C
      REAL*8 A(3,3),D
C
      D= 0.0
      D1=A(2,2)*A(3,3)-A(3,2)*A(2,3)
      D2=A(1,2)*A(3,3)-A(1,3)*A(3,2)
      D3=A(1,2)*A(2,3)-A(1,3)*A(2,2)
      D= A(1,1)*D1-A(2,1)*D2+A(3,1)*D3
      RETURN
      END
```

We claim:

1. A method for self-reference holographic imaging comprising illuminating an object with at least two radiation beams having different non-uniform spatial radiation characteristics across said object; detecting holograms of said objects for each of said radiation beams which are generated as a result of interference between radiation reflected by said object and radiation reflected by at least one reference reflector; and analyzing said holograms to form an unambiguous holographic image.

2. A method as specified in claim 1 wherein said illuminating step comprises illuminating said object with at least two radiation beams having different non-uniform spatial amplitude distribution.

3. A method as specified in claim 2 wherein said illuminating step comprises illuminating said object with at least two time-sequential radiation beams.

4. A method as specified in claim 2 wherein said illuminating step comprises illuminating said object with at least two radiation beams of different frequency.

5. A method as specified in claim 4 wherein said radiation beams are concurrent in time.

6. A method as specified in claim 2 wherein said illuminating step comprises illuminating said object with said at least two radiation beams displaced from each other across said object.

7. A method as specified in claim 2 wherein said illuminating step comprises illuminating said object with said at least two radiation beams having identical non-uniformity and which are displaced from each other thereby to provide different spatial amplitude distribution.

8. A method as specified in claim 7 wherein said radiation beams are angularly displaced from each other.

9. A method as specified in claim 2 wherein said step of illuminating comprises illuminating said object with at least two radiation beams each having a Gaussian power distribution, said beams being angularly displaced from each other across said object.

10. A method as specified in claim 9 wherein said radiation beams comprise laser beams.

11. A method as specified in claim 9 wherein said radiation beams comprise ultrasonic beams.

12. A method as specified in claim 1 wherein said illuminating step comprises illuminating said object with at least two time-sequential radiation beams.

13. A method as specified in claim 1 wherein said illuminating step comprises illuminating said object with at least two radiation beams of different frequency.

14. A method as specified in claim 13 wherein said radiation beams are concurrent in time.

15. A method for on-axis holographic imaging comprising illuminating an object with at least two radiation beams having different spatial radiation characteristics across said object; detecting holograms of said object for each of said radiation beams, said holograms being generated as a result of interference between diffuse radiation reflected by said object and reference radiation reflected specularly by said object; and analyzing said holograms to form an unambiguous holographic image.

16. A method as specified in claim 15 wherein said illuminating step comprises illuminating said object with at least two radiation beams having different non-uniform spatial amplitude distributions.

17. A method as specified in claim 16 wherein said illuminating step comprises illuminating said object with at least two time-sequential radiation beams.

18. A method as specified in claim 16 wherein said illuminating step comprises illuminating said object with at least two radiation beams of different frequency.

19. A method as specified in claim 18 wherein said radiation beams are concurrent in time.

20. A method as specified in claim 16 wherein said illuminating step comprises illuminating said object with said at least two radiation beams displaced from each other across said object.

21. A method as specified in claim 16 wherein said illuminating step comprises illuminating said object with said at least two radiation beams having identical non-uniformity and displaced from each other thereby to provide different spatial distribution.

22. A method as specified in claim 21 wherein said radiation beams are angularly displaced from each other.

23. A method as specified in claim 16 wherein said step of illuminating comprises illuminating said object with at least two radiation beams each having a Gaussian power distribution, said beams being angularly displaced from each other across said object.

24. A method as specified in claim 23 wherein said radiation beams comprise laser beams.

25. A method as specified in claim 23 wherein said radiaton beams comprise ultrasonic beams.

26. A method as specified in claim 15 wherein said illuminating step comprises illuminating said object with at least two time-sequential radiation beams.

27. A method as specified in claim 15 wherein said illuminating step comprises illuminating said object with at least two radiation beams of different frequency.

28. A method as specified in claim 27 wherein said radiation beams are concurrent in time.

29. A method of forming an unambiguous image from self-referenced, on-axis holograms of an object having N specular reflections and other diffuse reflections, comprising illuminating said object with at least two beams of radiation, each having a different spatial radiation characteristics across said object; detecting holograms for each of said beams, said holograms being generated as a result of interference between said specular reflections and other reflections from said object; and analyzing said holograms to form an unambiguous image of said object.

30. A method as specified in claim 29 wherein said illuminating step comprises illuminating said object with at least 2N beams radiation.

31. A method as specified in claim 30 wherein said illuminating step comprises illuminating said object with at least 2N beams of radiation having different non-uniform spatial amplitude distribution.

32. A method as specified in claim 31 wherein said beams are sequential in time.

33. A method as specified in claim 31 wherein said analyzing step comprises forming 2N linear equations for the unknown reflectivity of diffuse portions of said objects and solving said linear equations to obtain values for said reflectivity.

34. A method as specified in claim 29 wherein said illuminating step comprises illuminating said object with a continuously moving radiation beam.

* * * * *

UNITED STATES PATENT AND TRADEMARK OFFICE
CERTIFICATE OF CORRECTION

PATENT NO. : 4,889,398
DATED : Dec. 26, 1989
INVENTOR(S) : Elbaum et al.

It is certified that error appears in the above-identified patent and that said Letters Patent is hereby corrected as shown below:

First page, Item 75, 4th line, insert -- Mitchell Wlodawski, Brooklyn, N.Y.; Yaakov Y. Gorlin, Highland Park, N.J.--.

Col. 3, line 44, "$U_r(\vec{r})$" should read --$U_r(\vec{r}')$--; line 50,

"
$$U_r(r') \propto \sum_{n=1}^{N} A(r_n) B_1(r_n) \exp[i\pi(r' - r_n)^2/\lambda]$$
$$U_o(r') \propto \int dr\, a(r) B_1(r) \exp[i\pi(r' - r)^2/\lambda z]$$
"
should read $$U_r(\vec{r}') \propto \sum_{n=1}^{N} A(\vec{r}_n) B_1(\vec{r}_n) \exp[i\pi(\vec{r}' - \vec{r}_n)^2/\lambda]$$

-- --

$$U_o(\vec{r}') \propto \int d\vec{r}\, a(\vec{r}) B_1(\vec{r}) \exp[i\pi(\vec{r}' - \vec{r})^2/\lambda z]$$

Col. 3, line 66, "$U(r')$" should read --$U(\vec{r}')$--.

Col. 4, lines 4-9, "
$$F_1(r'') = \int dr'\, \Delta U(r') \exp[i(2\pi/\lambda z) r' \cdot r''] \propto$$
$$\sum_{n=1}^{N} [A^*(r_n) B_1^*(r_n) B_1(r_n + r'') a(r_n + r'') +$$
$$A(r_n) B_1(r_n) B_1^*(r_n - r'') a^*(r_n - r'')]$$
" should read $$F_1(\vec{r}'') = \int d\vec{r}'\, \Delta U(\vec{r}') \exp[i(2\pi/\lambda z) \vec{r}' \cdot \vec{r}'']$$

-- $\propto \sum_{n=1}^{N} [\tilde{A}^*(\vec{r}_n) B_1^*(\vec{r}_n) B_1(\vec{r}_n + \vec{r}'') \tilde{a}(\vec{r}_n + \vec{r}'')$ --

$$+ \tilde{A}(\vec{r}_n) B_1(\vec{r}_n) B_1^*(\vec{r}_n - \vec{r}'') \tilde{a}^*(\vec{r}_n - \vec{r}'')]$$

UNITED STATES PATENT AND TRADEMARK OFFICE
CERTIFICATE OF CORRECTION

PATENT NO. : 4,889,398

DATED : Dec. 26, 1989

INVENTOR(S) : Elbaum et al.

It is certified that error appears in the above-identified patent and that said Letters Patent is hereby corrected as shown below:

Col. 4, line 28, "images" should read --image--; lines 46-50, $$( |F_p(r)|^2 \propto \sum_{n=1}^{N} |A(r_n)|^2 |B_p(r_n)|^2 [|B_p(r_n + r')|^2 < |a(r_n + r')|^2 > + |B_p(r_n - r')|^2 < |a(r_n - r')|^2 > ] )$$

should read $$-- |F_p(\vec{r})|^2 \propto \sum_{n=1}^{N} |A(\vec{r}_n)|^2 |B_p(\vec{r}_n)|^2 [|B_p(\vec{r}_n + \vec{r}")|^2 <|a(\vec{r}_n+\vec{r}")|^2> + |B_p(\vec{r}_n - \vec{r}")|^2 < |a(\vec{r}_n - \vec{r}")|^2 > ] --$$

Col. 16, line 66, "radiaton" should read --radiation--.

Col. 18, line 3, after "beams" insert --of--; line 13, "objects" should read --object--.

Signed and Sealed this

Sixteenth Day of April, 1991

Attest:

HARRY F. MANBECK, JR.

Attesting Officer

Commissioner of Patents and Trademarks